United States Patent
Stratton et al.

(10) Patent No.: US 7,793,219 B1
(45) Date of Patent: Sep. 7, 2010

(54) CONSTRUCTION OF MULTIMEDIA COMPOSITIONS

(75) Inventors: Norman A. Stratton, Littleton, MA (US); Paul Siegel, Davis, CA (US); William Bachman, San Jose, CA (US); Mark Detweiler, San Francisco, CA (US)

(73) Assignee: Adobe Systems Inc., San Jose, CA (US)

( * ) Notice: Subject to any disclaimer, the term of this patent is extended or adjusted under 35 U.S.C. 154(b) by 776 days.

(21) Appl. No.: 11/635,422

(22) Filed: Dec. 7, 2006

(51) Int. Cl.
G06F 3/00 (2006.01)
G06F 17/21 (2006.01)
G06F 3/14 (2006.01)

(52) U.S. Cl. .................... 715/723; 715/207; 715/839

(58) Field of Classification Search .................. 715/723
See application file for complete search history.

(56) References Cited

U.S. PATENT DOCUMENTS 5,317,732 A * 5/1994 Gerlach et al. ........... 707/104.1
5,539,869 A * 7/1996 Spoto et al. ................. 715/707
5,619,636 A * 4/1997 Sweat et al. ................. 715/202
5,754,179 A * 5/1998 Hocker et al. ............... 715/835
5,850,548 A * 12/1998 Williams .................... 717/107
5,892,507 A * 4/1999 Moorby et al. .............. 715/723

OTHER PUBLICATIONS

Bonnie, John, et al. Evaluating a multimedia authoring tool, Nov. 1, 1997, Journal of the American Society for Information Science, vol. 48, iss. 11, p. 1004.*

* cited by examiner

Primary Examiner—William L Bashore
Assistant Examiner—Jordany Núñez
(74) Attorney, Agent, or Firm—Chapin IP Law, LLC

(57) ABSTRACT

Novel techniques and tools for authoring multimedia compositions are presented. The novel techniques and tools allow an author of a multimedia composition to create a multimedia composition by dragging assets from a first window containing a project's unused assets and placing the assets into a structural relationship in a second window. The author may also remove assets from the structural relationship in the second window and return the assets to the first window of unused assets. The novel techniques and tools allow an author of a multimedia composition to better keep track of the assets to be used in the multimedia composition.

28 Claims, 8 Drawing Sheets

300

310
RECEIVE INPUT ASSOCIATED WITH A FIRST GRAPHICAL OBJECT IN A FIRST WINDOW OF A GRAPHICAL USER INTERFACE

320
IN RESPONSE TO RECEIVING THE INPUT ASSOCIATED WITH THE FIRST GRAPHICAL OBJECT:

330
MOVE THE FIRST GRAPHICAL OBJECT FROM THE FIRST WINDOW TO A SECOND WINDOW IN THE GRAPHICAL USER INTERFACE

340
POSITION THE FIRST GRAPHICAL OBJECT IN A STRUCTURAL RELATIONSHIP OF GRAPHICAL OBJECTS IN THE SECOND WINDOW, THE STRUCTURAL RELATIONSHIP BEING A FIRST COLLECTION OF GRAPHICAL OBJECTS WITH EACH GRAPHICAL OBJECT REPRESENTING A PORTION OF INFORMATION RELATED TO A MULTIMEDIA COMPOSITION

610
RECEIVE INPUT ASSOCIATED WITH A SECOND GRAPHICAL OBJECT
IN THE STRUCTURAL RELATIONSHIP OF GRAPHICAL OBJECTS
IN THE SECOND WINDOW

620
IN RESPONSE TO RECEIVING THE INPUT
ASSOCIATED WITH THE SECOND GRAPHICAL OBJECT

630
REMOVE THE SECOND GRAPHICAL OBJECT
FROM THE STRUCTURAL RELATIONSHIP OF GRAPHICAL OBJECTS
IN THE SECOND WINDOW

640
MOVE THE SECOND GRAPHICAL OBJECT
FROM THE SECOND WINDOW TO THE FIRST WINDOW

*FIG. 6*

CONSTRUCTION OF MULTIMEDIA COMPOSITIONS

FIELD OF THE INVENTION

The present disclosure relates generally to the creation of multimedia compositions. More specifically, particular embodiments disclosed herein relate generally to techniques and tools useful for authoring multimedia compositions.

BACKGROUND OF THE INVENTION

Conventional computerized devices, such as personal computers, laptop computers, and the like, utilize graphical user interfaces in applications, such as operating systems, and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons, and the user can operate an input device such as a mouse to move a mouse pointer onto an icon (i.e., graphically overlapping the icon) on the graphical user interface. By depressing a mouse button, the application (such as the operating system desktop) selects the icon, and if the user maintains the mouse button in a depressed state, the user can drag the icon across the graphical user interface. By releasing the mouse button, the icon is placed on the graphical user interface at the current position of the mouse pointer.

Using graphical user interface technology, users may create and edit documents and/or projects. For example, users can create navigation logic interconnecting portions of information for a Digital Video Disk (DVD), by selecting and placing graphical objects representing the portions of information (e.g., video clips, menus, and slide shows, etc.) into the navigation logic. Thus, DVD navigation logic (also referred to as DVD logic) results from interconnecting different video clips, menus, and slide shows together in an organized hierarchy. Typically, this hierarchy is in the form of a tree structure commonly referred to as a Flowchart, though any suitable type of organizational scheme may be used.

SUMMARY OF THE INVENTION

Conventional systems for authoring multimedia compositions commonly provide a window of graphical objects from which a user can choose graphical objects to be incorporated into a structural relationship, such as DVD logic. These windows in conventional systems generally contain a copy of items that can be included in a structural relationship displayed in another window. A user may drag an item from a library, for example, and position a copy of the item in the structural relationship. However, the item remains displayed as a choice in the library even after the user has placed a copy of the item in the structural relationship.

During the creation of a multimedia composition, such as a DVD, an author of the multimedia composition frequently finds it difficult to keep track of all the assets (i.e., portions of information) to be included in the multimedia composition. Techniques and tools discussed herein deviate with respect to and improve upon conventional technology such as discussed above and other techniques and tools also known in the prior art.

In a first embodiment, methods are disclosed that are useful in creating multimedia compositions. Such methods comprise receiving input associated with a first graphical object in a first window of a graphical user interface; and in response to receiving the input associated with the first graphical object: moving the first graphical object from the first window to a second window in the graphical user interface; and positioning the first graphical object in a structural relationship of graphical objects in the second window, the structural relationship being a collection of graphical objects with each graphical object representing a portion of information related to a multimedia composition. In addition, these methods may further comprise receiving input associated with a second graphical object in the structural relationship of graphical objects in the second window; and in response to receiving the input associated with the second graphical object: removing the second graphical object from the structural relationship of graphical objects in the second window; and moving the second graphical object from the second window to the first window. These methods may be repeated until the structural relationship in the second window is in a desirable configuration and can be saved on a computer-readable medium such as a DVD, for example.

In a second embodiment, logic is disclosed that is operable to perform methods and process disclosed herein. Logic disclosed herein can be repeatedly executed until the structural relationship in the second window is in a desirable configuration and can be saved on a computer-readable medium such as a DVD, for example. In a third embodiment, computer systems are disclosed that are enabled to perform methods and processes disclosed herein. The computer systems can be advantageously utilized to create multimedia compositions.

It is to be understood that the inventive matter disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The above and further objects, features, and advantages of disclosed embodiments may be better understood by referring to the following description in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

FIG. 3 illustrates procedures performable by a multimedia-composition processes in accordance with embodiments disclosed herein.

FIG. 6 illustrates procedures performable by a multimedia-composition process in accordance with embodiments disclosed herein.

DESCRIPTION OF EXAMPLE EMBODIMENTS

Figure 1:
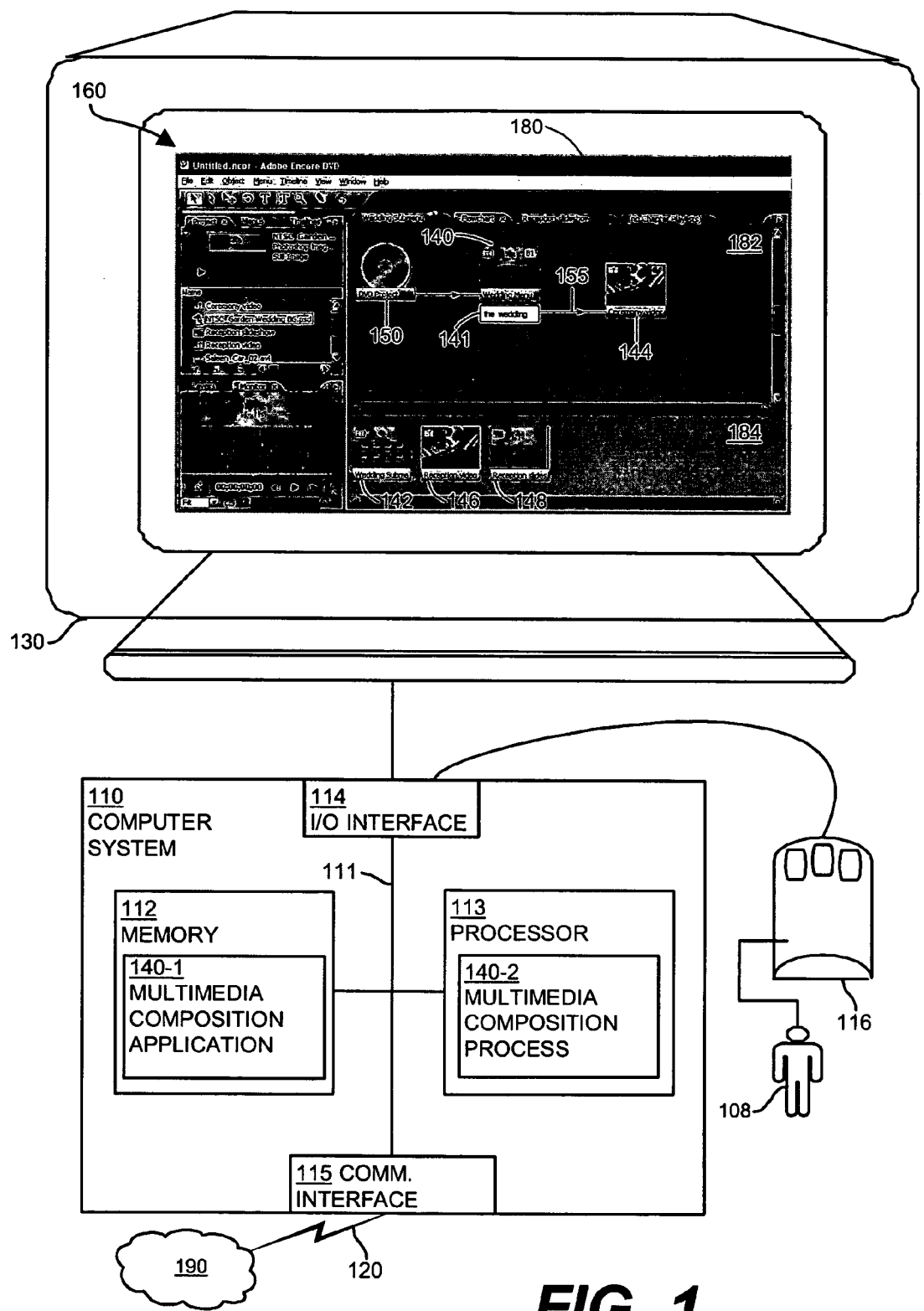
FIG. 1 is a block diagram of a computer environment illustrating an example architecture of a respective computer system useful for implementing a multimedia-composition application according to embodiments disclosed herein.

Conventional systems for authoring multimedia compositions commonly provide a window of graphical objects from which a user can choose graphical objects to be incorporated into a structural relationship, such as DVD logic. A window of graphical objects from which a user can choose graphical objects may be referred to, depending on the application, as a library, a stencil, a menu, or a palette, for example. These types of windows generally contain a copy of items that can be included in a structural relationship displayed in another window. Thus, a user may drag an item from a library, for example, and position a copy of the item in the structural relationship. However, the item remains displayed as a choice in the library even after the user has placed a copy of the item in the structural relationship.

During the creation of a multimedia composition, such as a DVD, an author of the multimedia composition frequently finds it difficult to keep track of all the assets (i.e., portions of information) to be included in the multimedia composition. As the number of assets to be included on a DVD increases, it becomes increasingly difficult for an author to determine which assets have already been included into the DVD logic and which assets remain unused.

Techniques and tools discussed herein deviate with respect to conventional technology such as discussed above and other techniques and tools also known in the prior art. Embodiments of applications discussed herein provide two windows with which a user can interact to create a multimedia composition. Both windows include graphical objects related to a multimedia composition. The first window includes graphical objects representing portions of information to be incorporated into the multimedia composition. That is, the graphical objects displayed in the first window are not yet incorporated into a structural relationship (i.e., they are unused). The second window includes a structural relationship of graphical objects. Each graphical object in the second window represents a portion of information currently included in the multimedia composition. Each graphical object in a structural relationship represents a state or node in the multimedia composition represented by the structural relationship.

In particular embodiments, a multimedia-composition application may display a graphical object representing a particular asset in either the first window or the second window (i.e., in the structural relationship), but not in both windows simultaneously. These embodiments are especially useful in those projects wherein each asset represented by a graphical object is intended to appear exactly once in a multimedia composition. A user may place all graphical objects representing assets related to the multimedia composition to be created into the first window at the beginning of the project. Alternately, a user may create new graphical objects related to the multimedia composition during the project and place the newly created graphical objects into the first window. As graphical objects in the first window are incorporated into a structural relationship, the multimedia-composition application removes the graphical objects from the first window and positions the graphical objects as a states or nodes in the structural relationship in the second window. Additionally, a user may create new graphical objects related to the multimedia composition during the project and incorporate these newly created graphical objects directly into the structural relationship in the second window without first placing the newly created graphical objects into the first window. In these particular embodiments, a user can easily ascertain whether all assets intended to be included in a multimedia composition are actually included in the multimedia composition or whether any assets remain to be incorporated into the multimedia composition. That is, if the first window becomes empty, then a user knows that all currently-created assets related to the multimedia composition have been incorporated into the structural relationship and the user can then save the structural relationship as DVD logic on a DVD, for example.

FIG. 1 is a block diagram of a computer environment 100 illustrating an example architecture of a respective computer system 110 useful for implementing a multimedia-composition application 140-1 according to embodiments disclosed herein. Computer system 110 can be a computerized device such as a personal computer, workstation, portable computing device, console, network terminal, processing device, etc. As shown, computer system 110 of the present example includes an interconnect 111, such as a data bus or other circuitry, that couples a memory system 112, a processor 113, I/O interface 114, and a communications interface 115. An input device 116 (e.g., one or more user/developer-controlled devices such as a keyboard, mouse, touchpad, trackball, etc.) couples to the processor 113 through the I/O interface 114 and enables a user 108, such as an author of DVD navigation logic, to provide input commands and generally interact with the graphical user interface 160 that the graphical multimedia-composition application 140-1 and the multimedia-composition process 140-2 provide on a display 130. I/O interface 114 potentially provides connectivity to peripheral devices such as the input device 116, display screen 130, etc. The graphical user interface 160 displays a DVD authoring project 180 containing a Flowchart window 182, an UnusedAssetBin window 184, a first graphical object 140 representing a starting point, and a second graphical object 144. Communications interface 115 enables computer system 110 to communicate with network 190 over the communication link 120 to retrieve and transmit information from remotely located sources if necessary.

As shown, memory system 112 can be any type of computer-readable medium and in this example is encoded with multimedia-composition application 140-1 that supports functionality as herein described. Multimedia-composition application 140-1 can be embodied as computer software code such as data and/or logic instructions (e.g., code stored in the memory system 112 or on another computer-readable medium such as a disk) that supports processing functionality according to different embodiments described herein. During operation of the computer system 110, processor 113 accesses the memory system 112 via the interconnect 111 in order to launch, run, execute, interpret, or otherwise perform the logic instructions of the multimedia-composition application 140-1. Execution of the multimedia-composition application 140-1 produces processing functionality in a multimedia-composition process 140-2. In other words, the multimedia-composition process 140-2 represents one or more portions of the multimedia-composition application 140-1 performing within or upon the processor 113 in the computer system 110. Those skilled in the art will understand that the computer system 110 can include other processes and/or software and hardware components, such as an operating system that controls allocation and use of hardware resources.

It should be noted that, in addition to the multimedia-composition process 140-2 that carries out method operations as discussed herein, other embodiments herein include the multimedia-composition application 140-1 itself (i.e., the un-executed or non-performing logic instructions and/or data). The multimedia-composition application 140-1 may be stored on a computer-readable medium such as a floppy disk, hard disk, or in an optical medium. According to other embodiments, the multimedia-composition application 140-1 can also be stored in a memory type system such as in firmware, read only memory (ROM), or, as in this example, as executable code within the memory system 112 (e.g., within Random Access Memory or RAM). Thus, it should be understood that embodiments disclosed herein include logic encoded in one or more tangible media for execution and when executed is operable to perform methods and processes disclosed herein.

Functionality supported by computer system 110 and, more particularly, functionality associated with multimedia-composition application 140-1 and multimedia-composition process 140-2 is herein discussed in relation to FIGS. 1-8. For purposes of the following discussion, computer system 110 generally performs procedures in flowcharts illustrated in particular Figures. However, other entities can be configured to provide similar functionality.

The graphical user interface 160 displays a DVD authoring project 180. During the operation of the multimedia-composition application 140-1, a user may interact with the graphical user interface 160 to create DVD logic. DVD logic, and nearly every form of interactive animation, is composed of a set of states, or nodes. These states or nodes can be video clips, menus, or slide shows, for example. The states or nodes may be connected or linked to any other state or node in the logic through a limited set of user choices available to the user.

As a user interacts with the graphical user interface 160 to create the DVD logic, the graphical user interface 160 displays a structural relationship representing the DVD logic in a window of the graphical user interface 160. This structural relationship is frequently referred to as a Flowchart. In FIG. 1, the graphical user interface 160 displays a structural relationship (i.e., a Flowchart) in the Flowchart window 182. A structural relationship comprises a collection of graphical objects with each graphical object representing a portion of information related to a multimedia composition. For example, the Flowchart in FIG. 1 includes a first graphical object 140 and a second graphical object 144. The first graphical object 140 represents a starting point and contains a menu item list 141. A link 155 exists between the starting point 140 and a second graphical object 144. A link from a first graphical object to a second graphical object is a relationship between the two graphical objects. In particular embodiments, a user may save the DVD logic represented by the Flowchart, including the portions of information represented by the graphical objects, on a DVD to create a multimedia composition. When a viewer inserts such a DVD into a DVD player, the DVD begins at a pre-defined location (i.e., the starting point) on the DVD. This pre-defined location (i.e., the starting point) is also commonly referred to as DVD First Play. Thus, the multimedia-composition process 140-2 identifies the DVD First play (i.e., the starting point).

Figure 2:
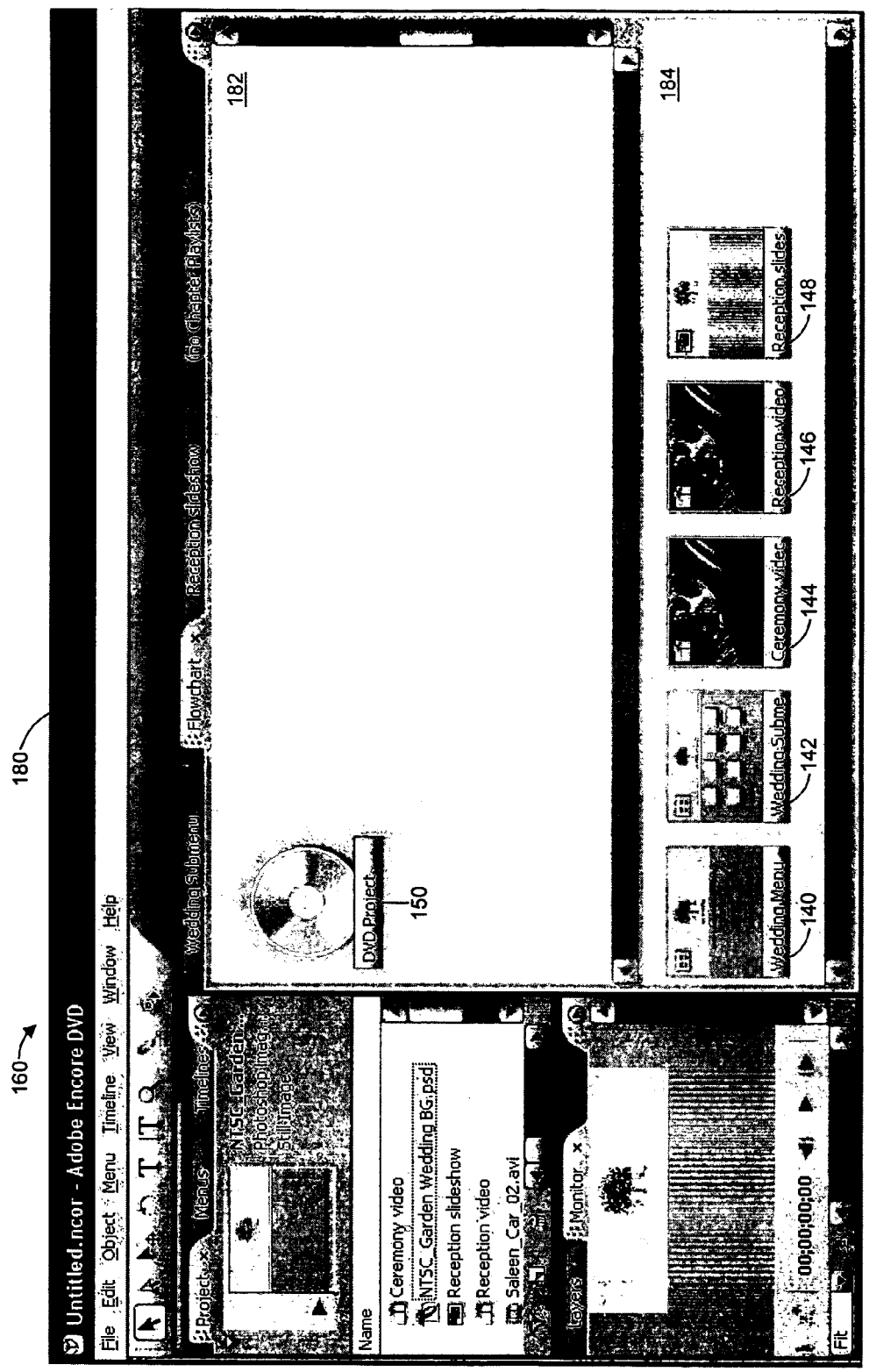
FIG. 2 illustrates a graphical user interface, in accordance with embodiments disclosed herein, as it appears at the start of a DVD authoring project.

FIG. 2 shows a partial view of a graphical user interface 160. In FIG. 2, the graphical user interface 160 is displaying a Flowchart window 182 and an UnusedAssetBin window 184. The Flowchart window 182 and the UnusedAssetBin window 184 are displayed in FIG. 2 as they could be displayed after the multimedia-composition process is first initialized and no Flowchart has been created. The Flowchart window 182 is empty except for a graphical object 150 that identifies the graphical user interface 160 as part of a DVD authoring project 180 (i.e., a multimedia-composition application). The UnusedAssetBin window 184 contains five graphical objects 140, 142, 144, 146, 148. Each graphical object represents a portion of information to be included on the DVD. The portions of information may include menus, video clips, and slide shows, for example. For example, in FIG. 2, two graphical objects 140, 142 that can be incorporated into the Flowchart represent menus; two graphical objects 144, 146 that can be incorporated into the Flowchart represent video clips, and one graphical object 148 that can be incorporated into the Flowchart represents a slide show. The portions of information may also be referred to as assets.

In particular embodiments, the graphical user interface 160 may maintain an order of graphical objects in the UnusedAssetBin window 184. The graphical user interface 160 may maintain this order, for example, by arranging the graphical objects in the UnusedAssetBin window 184 according to at least one attribute of the information portions represented by the graphical objects. Attributes that the graphical user interface 160 may use to arrange graphical objects in the UnusedAssetBin window 184 include, for example, the type of information portion represented and the title of the information portion represented. For example, the graphical user interface 160 has arranged the graphical objects 140, 142, 144, 146, 148 by type of information portion. That is the two graphical objects 140, 142 representing menus are displayed together; next, the two graphical objects 144, 146 representing video clips are displayed together; and finally, and the graphical object 148 representing a slide show is displayed.

In particular embodiments, the graphical user interface 160 may initially display, in the UnusedAssetBin 184, graphical objects representing substantially all portions of information identified as related to the multimedia composition to be created. For example, graphical objects initially displayed in the UnusedAssetBin 184 may represent all the information portions to be included in a DVD. In this manner, a DVD author will be able to ascertain whether the Flowchart in the Flowchart window 182 represents DVD logic that includes all the information portions intended to be included. If the UnusedAssetBin 184 window becomes empty, then the DVD author will have incorporated into the Flowchart all the graphical objects initially displayed in the UnusedAssetBin 184. At that point (i.e., empty UnusedAssetBin window 184), the Flowchart will include all the information portions intended to be included in the DVD logic and the DVD logic can the be saved to a DVD.

During creation of a Flowchart representing the DVD logic to be saved on a DVD, a user may choose graphical objects from graphical objects displayed in the UnusedAssetBin window 184 and incorporate the chosen graphical objects into the Flowchart in the Flowchart window 182. This process is explained further with the help of FIGS. 3 and 4. FIG. 3 illustrates procedures 300 that can be performed by the multimedia-composition process 140-2. In step 310, the multimedia-composition process 140-2 receives input associated with a first graphical object in a first window of a graphical user interface. For example, a user interacting with the graphical user interface 160 as shown in FIG. 2 may wish to incorporate a first graphical object 140 in the UnusedAssetBin window 184 into a Flowchart in the Flowchart window 182. The input received by the multimedia-composition process 140-2 may include, for example, a selection of the first graphical object 140 in the UnusedAssetBin window 184. The multimedia-composition process 140-2 may receive this input as a result of a user selecting the graphical object 140 by clicking the graphical object 140. Similarly, the multimedia-composition process 140-2 may also receive input that is a result of a user dragging the graphical object 140 from the UnusedAssetBin window 182 and placing the graphical object 140 onto the "DVD Project" graphical object 150. In this manner, a user may interact with the graphical user interface 160, providing input to the multimedia-composition process 140-2. The multimedia-composition process 140-2 may receive these inputs and respond to these inputs by performing particular procedures disclosed herein. Which procedures the multimedia-composition process 140-2 performs depends on what inputs are received.

In step 320, the multimedia-composition process 140-2 responds to receiving the input associated with the first graphical object by performing step 330 and step 340. For example, a user may wish to incorporate the menu represented by the graphical object 140 in the UnusedAssetBin window 184 into a Flowchart in the Flowchart window 182. The user may accomplish this incorporation by dragging the graphical object 140 from the UnusedAssetBin window 184 and into the Flowchart window 182 and positioning the graphical object 140 into the Flowchart. The multimedia-composition process 140-2 may receive this input associated with the graphical object 140 and respond to the received input by performing step 330, moving the graphical object 140 from the UnusedAssetBin window 184 to the Flowchart window 182, and performing step 340, positioning the graphical object 140 in the Flowchart at the position indicated by the user's input. By moving a graphical object from the UnusedAssetBin window 184 to the Flowchart window 182, it is meant that the graphical object is displayed in the Flowchart window 182 and the previous display of the graphical object in the UnusedAssetBin window 184 is removed. In other words, a graphical object related to a structural relationship representing a multimedia composition can be displayed in either the UnusedAssetBin window 184 or in the Flowchart window 182, but not in both windows at the same time. Thus, a graphical object is either included in the Flowchart and is displayed in the Flowchart window 182 or is not included in the Flowchart and is displayed in the UnusedAssetBin window 184.

Figure 4:
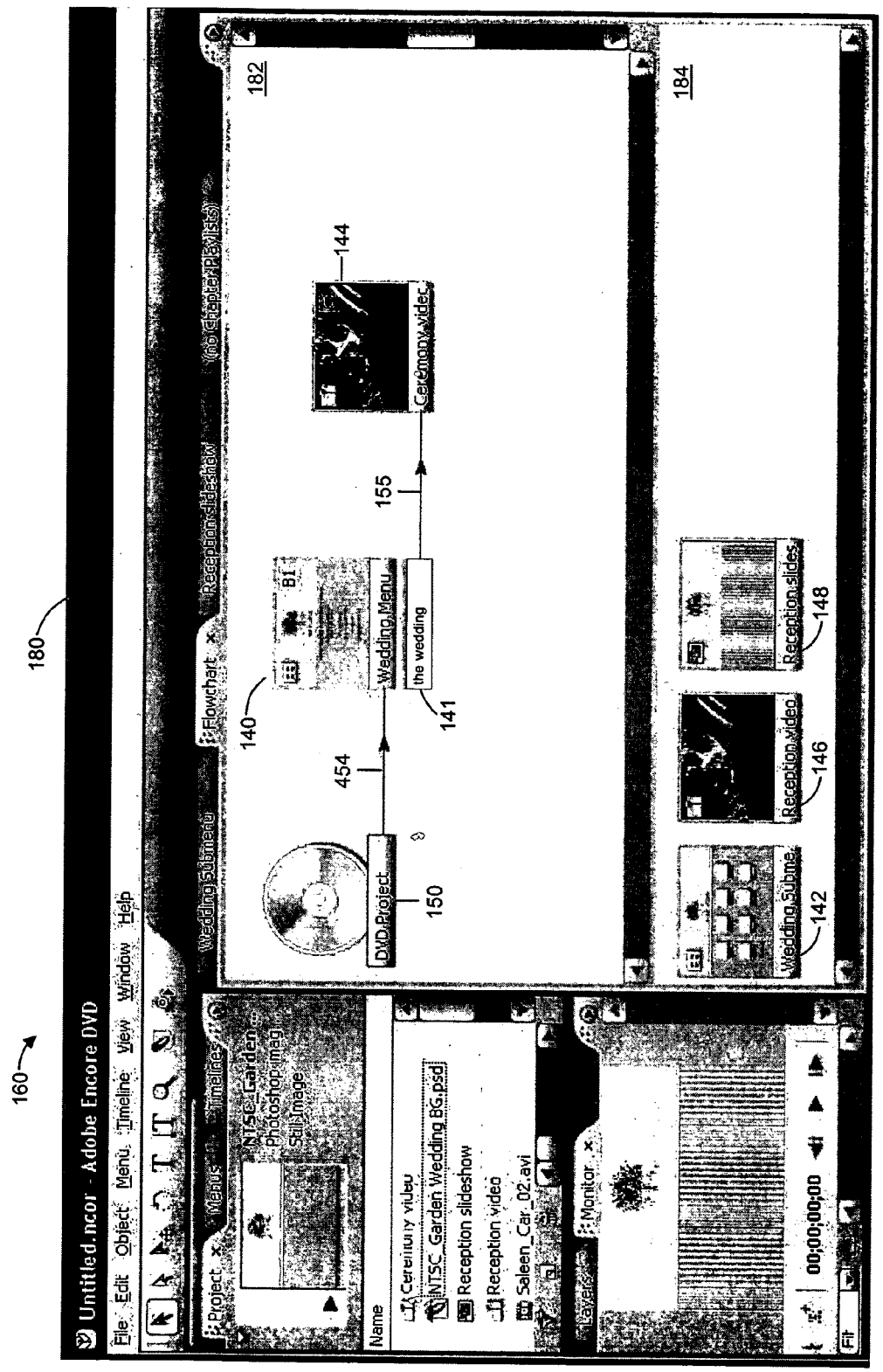
FIG. 4 illustrates a graphical user interface, in accordance with embodiments disclosed herein, as it appears after some of the graphical objects related to a multimedia composition have been incorporated into a structural relationship.

FIG. 4 shows the graphical user interface 160 as it might appear after a user has incorporated two graphical objects 140, 144 from the UnusedAssetBin window 184, as it appears in FIG. 2, into the Flowchart displayed in the Flowchart window 182. This incorporation can be accomplished by moving the first graphical object 140 from the UnusedAssetBin window 184 into the Flowchart window 182 and placing the first graphical object 140 on top of the "DVD Project" graphical object 150. By placing the first graphical object 140 on top of the "DVD Project" graphical object 150, the user instructs the multimedia-composition process 140-2 to respond by creating a link 454 from the "DVD Project" graphical object 150 to the first graphical object 140. The multimedia-composition process 140-2 also responds by displaying the link 454 and the first graphical object 140 in the Flowchart window 182. Thus, in this manner, the multimedia-composition process 140-2 positions the first graphical object 140 in the Flowchart displayed in the Flowchart window 182.

A user may incorporate the second graphical object 144 into the Flowchart in the Flowchart window 182 in a similar manner. For example, a user may drag the second graphical object 144 from the UnusedAssetBin window 184 to the Flowchart window 182 and place the second graphical object 144 on the first graphical object 140. The multimedia-composition process 140-2 responds to this user input by positioning the second graphical object 144 in the Flowchart in the Flowchart window 182. The multimedia-composition process 140-2 may accomplish this positioning by adding a menu item to the first graphical object 140, which represents a menu, and display a menu item list 141 associated with the first graphical object 140. The multimedia-composition process 140-2 may also create a link 155 from the first graphical object 140 to the second graphical object 144. In particular embodiments, the multimedia-composition process 140-2 may create text, to be displayed with the menu item, from the title of the second graphical object 144. In other embodiments, the multimedia-composition process 140-2 may receive text input from a user to be displayed with the menu item.

Figure 5:
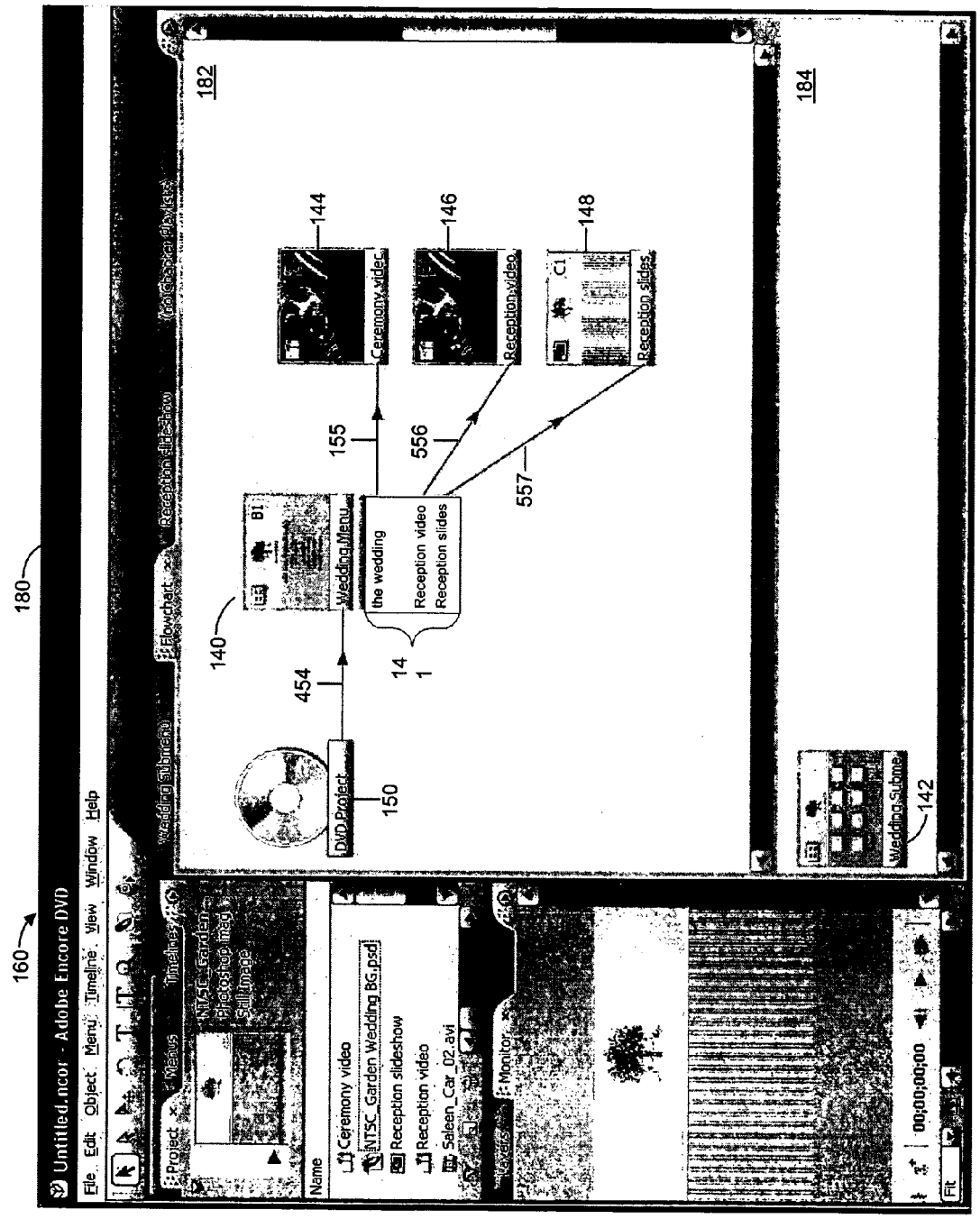
FIG. 5 illustrates a graphical user interface, in accordance with embodiments disclosed herein, as it appears after additional graphical objects related to a multimedia composition have been incorporated into the structural relationship shown in FIG. 4.

Similarly, FIG. 5 shows a partial view of the graphical user interface 160 after a user has added two additional graphical objects 146, 148 to the Flowchart shown in FIG. 4. Each of these two additional graphical objects 146, 148 can be incorporated into the Flowchart in the Flowchart window 182 in a manner similar to the manner in which the second graphical object 144 was incorporated into the Flowchart in the Flowchart window 182 as described above. In FIG. 5, the menu item list 141 contains three menu items and each menu item is linked to a graphical object. A first link 155 links the first menu item in the menu item list 141 to the second graphical object 144; a second link 556 links the second menu item in the menu item list 141 to the third graphical object 146; and a third link 557 links the third menu item in the menu item list 141 to the fourth graphical object 148.

During the process of creating a Flowchart in the Flowchart window 182, a user may desire to remove a graphical object from the Flowchart window 182 and return the graphical object to the UnusedAssetBin window 184. For example, a user may wish to return the fourth graphical object 148 from the Flowchart window 182 as shown in FIG. 5 to the UnusedAssetBin window 184 as shown in FIG. 4. A user may accomplish this removal by dragging the fourth graphical object 148 from the Flowchart window 182 to the UnusedAssetBin window 184. Alternately, a user may accomplish this removal by highlighting the fourth graphical object 148 and then either pressing a "delete" key or choosing a "remove" or "delete" command from a menu, etc. The multimedia-composition process 140-2 receives this user input associated with the fourth graphical object 148 in the Flowchart window 182 and responds to the received input. The multimedia-composition process 140-2 responds to the user input by removing both the display of the fourth graphical object 148 and the display of the associated link 557 from the Flowchart window 182 and displaying the fourth graphical object 148 in the UnusedAssetBin window 184. Similarly, a user may remove the third graphical object 146 from the Flowchart in the Flowchart window 182 and return it to the UnusedAssetBin window 184.

FIG. 6 illustrates procedures 600 that can be performed by the multimedia-composition process 140-2 for removing graphical objects from the Flowchart in the Flowchart window 182 and returning them to the UnusedAssetBin window 184. In step 610, the multimedia-composition process 140-2 receives input associated with a graphical object in the structural relationship of graphical objects (i.e., the Flowchart) in the Flowchart window 182. In step 620, the multimedia-composition process 140-2 responds to the received input by performing step 630 and step 640. In step 630, the multimedia-composition process 140-2 removes the graphical object from the structural relationship in the Flowchart window 182 (i.e., the Flowchart). In step 640, the multimedia-composition process 140-2 moves the graphical object from the Flowchart window 182 to the UnusedAssetBin window 184. Again, once a graphical object is displayed in the UnusedAssetBin window 184 it is not used in the Flowchart and is not displayed in the Flowchart window 182.

In particular embodiments, a user may simultaneously remove multiple graphical objects from the Flowchart window 182 and return them to the UnusedAssetBin window 184. A user may feel that a current configuration of the Flowchart is inaccurate and may wish to return the Flowchart to an earlier configuration so that the inaccuracy can be corrected. For example, a user may feel that the configuration of the Flowchart shown in FIG. 5 is not accurate and the user may desire to revert the Flowchart to the configuration shown in FIG. 2 so that the user can start all over. A user may accomplish this reversion by removing the graphical object 140 linked to the "DVD Project" graphical object 150. Once the graphical object 140 is removed from the Flowchart, three other graphical objects 144, 146, 148 are removed because their only links in the Flowchart are to a graphical object 140 that is being removed. Thus, in the procedures 600, the multimedia-composition process 140-2 may receive input associated with a second graphical object 140, as in step 610, and respond to the received input by removing at least one third graphical object 144, 146, 148 from the structural relationship of graphical objects (i.e., the Flowchart) in the Flowchart window 182 and moving the at least one third graphical object 144, 146, 148 from the Flowchart window 182 to the UnusedAssetBin window 184.

A user may also accomplish the reversion of the Flowchart to an earlier configuration by removing the link 454 between the "DVD Project" graphical object 150 and the linked graphical object 140. In this manner, the four graphical objects 140, 144, 146, 148 are removed from the Flowchart and moved to the UnusedAssetBin window 184. That is, the multimedia-composition process 140-2 may receive input (i.e., link 454 removal) associated with a second graphical object 140 (i.e., the linked graphical object), as in step 610, and respond to the received input by removing at least one third graphical object 144, 146, 148 from the structural relationship of graphical objects (i.e., the Flowchart) in the Flowchart window 182 and moving the at least one third graphical object 144, 146, 148 from the Flowchart window 182 to the UnusedAssetBin window 184. In particular embodiments, a user may remove a link, for example, by selecting the link and pressing a "delete" key or choosing a "remove" or "delete" command from a menu, etc.). In particular embodiments, a user may remove a link by placing a graphical object on top of the graphical object from which the link originates. For example, the link 454 between the "DVD Project" graphical object 150 and the linked graphical object 140 in FIG. 5 may be removed by dragging the graphical object 142 from the UnusedAssetBin window 184 and placing the graphical object 142 on top of the "DVD Project" graphical object 150, causing the multimedia-composition process 140-2 to remove the link 454 and create a new link from the "DVD Project" graphical object 150 to the graphical object 142.

Another manner by which a user may accomplish the reversion of the Flowchart to an earlier configuration is by highlighting all four graphical objects 140, 144, 146, 148 and providing input to remove the four graphical objects 140, 144, 146, 148 (e.g., pressing a "delete" key, choosing a "remove" or "delete" command from a menu, etc.). The multimedia-composition process 140-2 will receive this input and respond by removing all four graphical objects 140, 144, 146, 148 from the Flowchart and moving them to the UnusedAssetBin window 184.

In particular embodiments, the multimedia-composition process 140-2 may provide a user with a choice of moving removed objects to the UnusedAssetBin window 184 as described herein or deleting the removed objects from the multimedia-composition process 140-2 such that they are no longer considered related to the multimedia-composition and are not displayed in either the Flowchart or the UnusedAssetBin window 184.

In particular embodiments, when the multimedia-composition process 140-2 simultaneously removes multiple graphical objects from the Flowchart in the Flowchart window 182 and moves them to the UnusedAssetBin window 184 as described above, the multimedia-composition process 140-2 may remove the links from some or all of the graphical objects when they are moved to the UnusedAssetBin window 184. In other embodiments, the multimedia-composition process 140-2 may maintain some or all of the links between the graphical objects when the graphical objects are moved to the UnusedAssetBin window 184. In these other embodiments, there may exist links between graphical objects displayed in the UnusedAssetBin window 184. In some embodiments, the multimedia-composition process 140-2 may display links maintained between graphical objects in the UnusedAssetBin window 184 and, in other embodiments, the multimedia-composition process 140-2 may not display links maintained between graphical objects in the UnusedAssetBin window 184.

For example, the four graphical objects 140, 144, 146, 148 as displayed in the UnusedAssetBin window 184 in FIG. 2 may or may not have links existing between the graphical objects 140, 144, 146, 148. If the configuration in FIG. 2 is a result of initializing the multimedia-composition process 140-2, then the graphical objects 140, 144, 146, 148 most likely would not have any links existing between them. However, if the configuration in FIG. 2 is a result of a user moving multiple graphical objects from a Flowchart to the UnusedAssetBin window 184, then some of the graphical objects in the UnusedAssetBin window 184 may have links existing between them.

In still other embodiments, the multimedia-composition process 140-2 may provide a user with commands for modifying (e.g., adding and removing) links that are maintained between graphical objects displayed in the UnusedAssetBin window 184. In these embodiments, the multimedia-composition process 140-2 receives input from a user and responds by creating one or more structural relationships of graphical objects in the UnusedAssetBin window 184. The multimedia-composition process 140-2, responding to additional user input, may move these structural relationships from the UnusedAssetBin window 184 and position them into the Flowchart in the Flowchart window 182. In this manner, a user may be able to first create smaller structural relationships of graphical objects in the UnusedAssetBin window 184 and then build up a larger structural relationship of graphical objects (i.e., the Flowchart) in the Flowchart window 182 by moving the smaller structural relationships from the UnusedAssetBin window 184 to the Flowchart window 182 and positioning the smaller structural relationships into the Flowchart.

Figure 7:
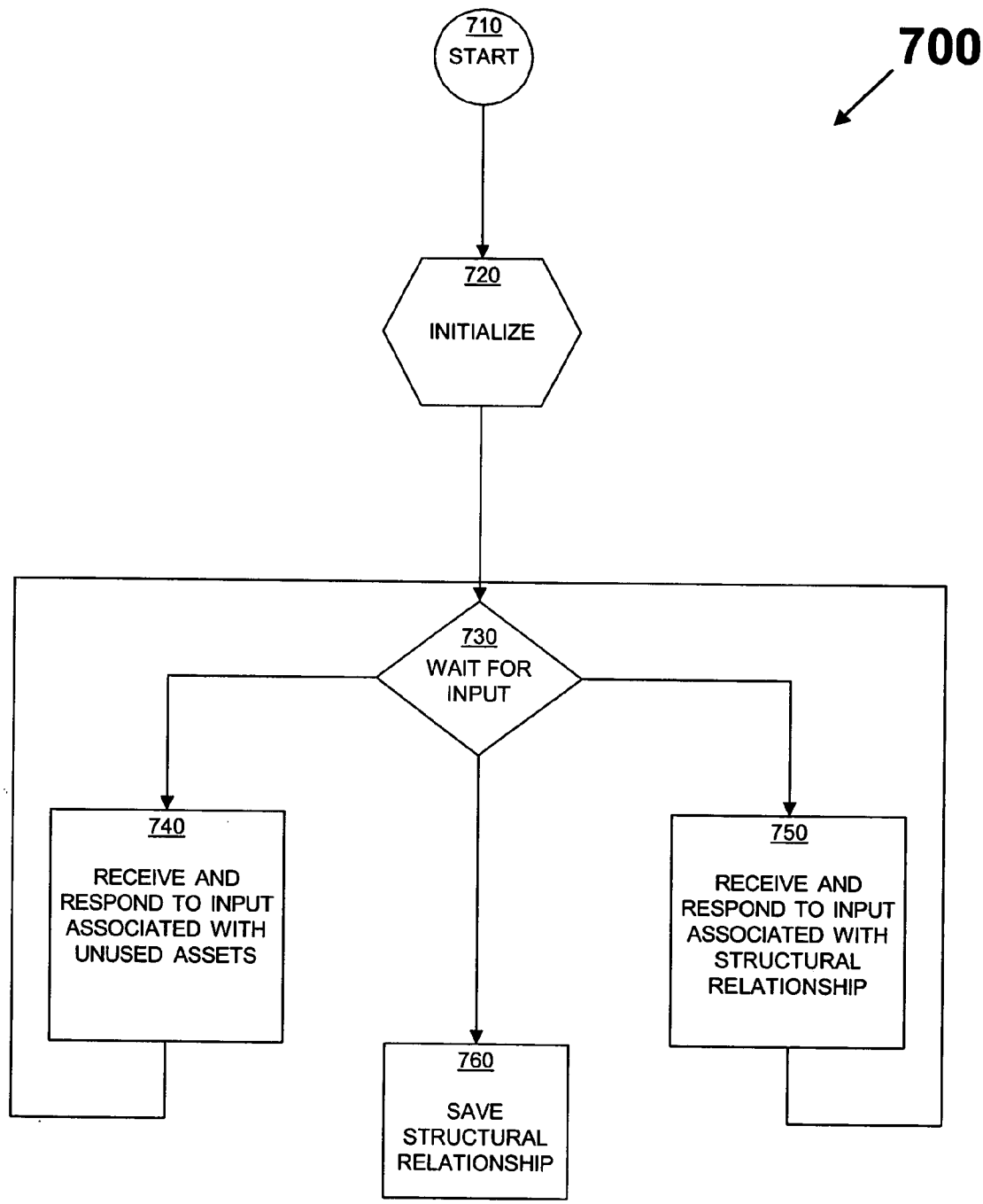
FIG. 7 is a flowchart illustrating an example procedure that can be performed by a multimedia-composition process in accordance with embodiments disclosed herein.

A user may continue interacting with the graphical user interface 160 until the Flowchart in the Flowchart window 182 is in a configuration that the user desires to save to a computer-readable medium, such as a DVD. FIG. 7 is a flowchart illustrating an example procedure 700 that can be performed by the multimedia-composition process 140-2 to facilitate the creation of a Flowchart. The procedure 700 starts in step 710 and proceeds to step 720. In step 720, the procedure 700 initializes the multimedia-composition process 140-2. In the initialization step 720 the multimedia-composition process 140-2 may determine whether a previously saved version of a structural relationship is to be loaded and modified or if no previously saved version of a structural relationship exists and the procedure 700 is to start with an empty structural relationship, such as the Flowchart shown in FIG. 2, for example. In step 730, the multimedia-composition process 140-2 waits for input. If, in step 730, input associated with unused assets is detected, the procedure 700 proceeds from step 730 to step 740. In step 740, the multimedia-composition process 140-2 receives the input associated with unused assets and responds to the input. For example, the multimedia-composition process 140-2 may perform step 740 by performing the procedures 300 illustrated in FIG. 3. Upon completion of step 740, the multimedia-composition process 140-2 returns to step 730 and waits for input. If, in step 730, input associated with the structural relationship is detected, the procedure 700 proceeds from step 730 to step 750. In step 750, the multimedia-composition process 140-2 receives the input associated with the structural relationship and responds to the input. For example, the multimedia-composition process 140-2 may perform step 750 by performing the procedures 600 illustrated in FIG. 6. Upon completion of step 750, the multimedia-composition process 140-2 returns to step 730 and waits for input. If, in step 730, input is detected that is determined to be associated with a user's desire to save the structural relationship to a computer-readable medium, then the procedure 700 proceeds to step 760 and the multimedia-composition process 140-2 saves the structural relationship to the computer-readable medium, as DVD logic for example, creating a multimedia composition.

Figure 8:
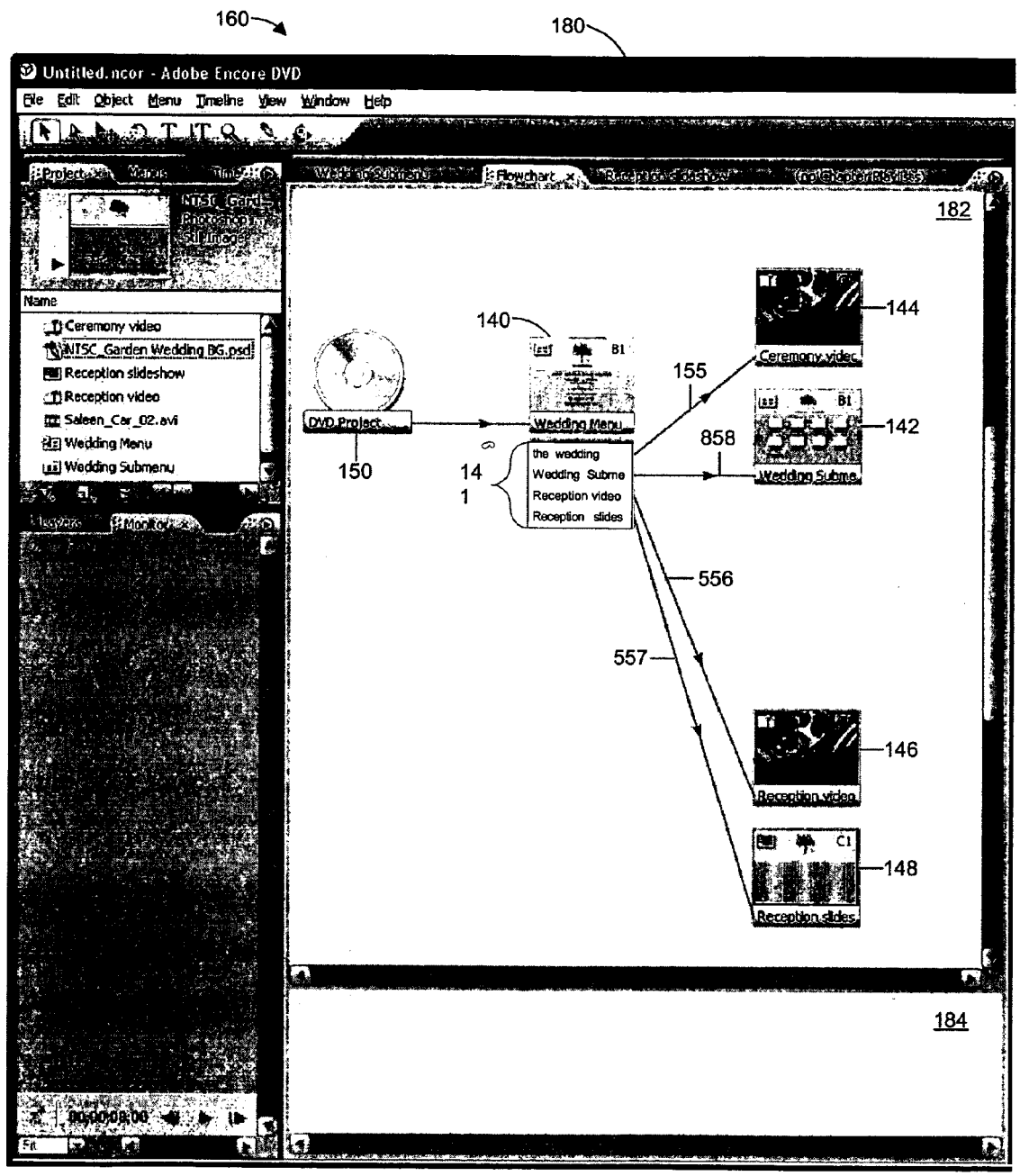
FIG. 8 illustrates a graphical user interface, in accordance with embodiments disclosed herein, as it appears after all graphical objects related to a multimedia composition have been incorporated into a structural relationship representing the multimedia composition.

FIG. 8 illustrates graphical user interface 160 as it would appear after a user has incorporated into a structural relationship representing the multimedia composition all graphical objects related to the multimedia composition. In embodiments initialized with all graphical objects related to the multimedia composition displayed in the UnusedAssetBin window 184, the empty UnusedAssetBin window 184 in FIG. 8 indicates to the user that all the graphical objects initially displayed in the UnusedAssetBin window 184 have been incorporated into the Flowchart in the Flowchart window 182 and the user can then save the Flowchart to a DVD, for example.

In accordance with embodiments described herein, novel techniques and tools for authoring multimedia compositions have been provided. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to be limiting. Rather, the scope of the inventive matter should be assessed as that of the appended claims and by equivalents thereto.

What is claimed is:

1. A method comprising:

receiving input associated with a first graphical object in a first window of a graphical user interface; and in response to receiving the input associated with the first graphical object:

moving the first graphical object from the first window to a second window in the graphical user interface;

positioning the first graphical object in a structural relationship of graphical objects in the second window, the structural relationship being a first collection of graphical objects with each graphical object representing a portion of information related to a multimedia composition;

displaying the first graphical object at a first level of a hierarchy displayed in the second window, the first graphical object representing a menu visible during a rendering of a new multimedia composition;

upon detecting movement of a second graphical object from the first window to the second window, displaying the second graphical object at a second level of the hierarchy, the second level of the hierarchy deeper than the first level of the hierarchy;

while the first graphical object is displayed, appending a first menu item, from the menu, to the first graphical object;

displaying a first link, in the second window, between the second graphical object and the first menu item appended to the first graphical object wherein appending the first menu item includes:

creating the first menu item to describe content associated with the second graphical object;

appending a graphical field to the first graphical object, the graphical field including display of the first menu item;

creating the first link, the first link including a first directional indicator that describes a parent-child relationship between the first graphical object and the second graphical object; and wherein displaying the first link includes: connecting the graphical field to the second graphical object via the first link;

wherein connecting the graphical field to the second graphical object via the first link includes:

indicating that video content associated with the second graphical object will be accessed upon selection of the first menu item from the rendered instance of the menu visible during the rendering of a new multimedia composition.

2. The method of claim 1, further comprising:

displaying a second collection of graphical objects in the first window prior to receiving the input associated with the first graphical object, the second collection representing substantially all portions of information identified as related to the multimedia composition.

3. The method of claim 1, further comprising:

creating a new graphical object; and displaying the new graphical object in the first window.

4. The method of claim 1, further comprising:

creating a new graphical object; and positioning the new graphical object in the structural relationship of graphical objects in the second window without first displaying the new graphical object in the first window.

5. The method of claim 1, further comprising:
maintaining an order of graphical objects in the first window, wherein maintaining the order of graphical objects in the first window comprises one of the group consisting of:
arranging the graphical objects in the first window according to at least one attribute of the represented information portion; and
arranging the graphical objects in the first window according to at least one attribute of the represented information portion, the at least one attribute selected from a list consisting of type of information portion and title of information portion.

6. The method of claim 1, further comprising:
displaying a structural relationship of graphical objects in the first window.

7. The method of claim 1, further comprising:
modifying a structural relationship of graphical objects in the first window in response to receiving input associated with at least one graphical object in the first window.

8. The method of claim 1, further comprising:
receiving input associated with a second graphical object in the structural relationship of graphical objects in the second window; and
in response to receiving the input associated with the second graphical object:
removing the second graphical object from the structural relationship of graphical objects in the second window; and
moving the second graphical object from the second window to the first window.

9. The method of claim 8, wherein responding to receiving the input associated with the second graphical object further comprises:
removing at least one third graphical object from the structural relationship of graphical objects in the second window, each third graphical object having a link to either the second graphical object or another third graphical object; and
moving the at least one third graphical object from the second window to the first window.

10. The method of claim 9, further comprising one of the group consisting of:
removing the link of each third graphical object; and
maintaining the link of each third graphical object after moving the at least one third graphical object from the second window to the first window.

11. The method of claim 9, further comprising:
displaying a structural relationship of graphical objects in the first window after responding to receiving the input associated with the second graphical object.

12. Logic encoded in one or more tangible media for execution and when executed operable to:
receive input associated with a first graphical object in a first window of a graphical user interface; and
in response to receiving the input associated with the first graphical object:
move the first graphical object from the first window to a second window in the graphical user interface;
position the first graphical object in a structural relationship of graphical objects in the second window, the structural relationship being a first collection of graphical objects with each graphical object representing a portion of information related to a multimedia composition;
displaying the first graphical object at a first level of a hierarchy displayed in the second window, the first graphical object representing a menu visible during a rendering of a new multimedia composition;
upon detecting movement of a second graphical object from the first window to the second window, displaying the second graphical object at a second level of the hierarchy, the second level of the hierarchy deeper than the first level of the hierarchy;
while the first graphical object is displayed, appending a first menu item, from the menu, to the first graphical object;
displaying a first link, in the second window, between the second graphical object and the first menu item appended to the first graphical object wherein appending the first menu item includes:
creating the first menu item to describe content associated with the second graphical object;
appending a graphical field to the first graphical object, the graphical field including display of the first menu item;
creating the first link, the first link including a first directional indicator that describes a parent-child relationship between the first graphical object and the second graphical object; and
wherein displaying the first link includes: connecting the graphical field to the second graphical object via the first link;
wherein connecting the graphical field to the second graphical object via the first link includes:
indicating that video content associated with the second graphical object will be accessed upon selection of the first menu item from the rendered instance of the menu visible during the rendering of a new multimedia composition.

13. The logic of claim 12, wherein the logic is further operable to:
display a second collection of graphical objects in the first window prior to receiving the input associated with the first graphical object, the second collection representing substantially all portions of information identified as related to the multimedia composition.

14. The logic of claim 12, wherein the logic is further operable to:
create a new graphical object; and
display the new graphical object in the first window.

15. The logic of claim 12, wherein the logic is further operable to:
create a new graphical object; and
position the new graphical object in the structural relationship of graphical objects in the second window without first displaying the new graphical object in the first window.

16. The logic of claim 12, wherein the logic is further operable to maintain an order of graphical objects in the first window, wherein the logic is further operable to perform at least one of the group consisting of:
arrange the graphical objects in the first window according to at least one attribute of the represented information portion; and
arrange the graphical objects in the first window according to at least one attribute of the represented information portion, the at least one attribute selected from a list consisting of type of information portion and title of information portion.

17. The logic of claim 12, wherein the logic is further operable to:

display a structural relationship of graphical objects in the first window.

18. The logic of claim 12, wherein the logic is further operable to:

modify a structural relationship of graphical objects in the first window in response to receiving input associated with at least one graphical object in the first window.

19. The logic of claim 12, wherein the logic is further operable to:

receive input associated with a second graphical object in the structural relationship of graphical objects in the second window; and in response to receiving the input associated with the second graphical object:

remove the second graphical object from the structural relationship of graphical objects in the second window; and move the second graphical object from the second window to the first window.

20. The logic of claim 19, wherein the logic is further operable to:

in response to receiving the input associated with the second graphical object:

remove at least one third graphical object from the structural relationship of graphical objects in the second window, each third graphical object having a link to either the second graphical object or another third graphical object; and move the at least one third graphical object from the second window to the first window.

21. The logic of claim 20, wherein the logic is further operable to perform one of the group consisting of:

remove the link of each third graphical object;

maintain the link of each third graphical object after moving the at least one third graphical object from the second window to the first window.

22. The logic of claim 20, wherein the logic is further operable to:

display a structural relationship of graphical objects in the first window after responding to receiving the input associated with the second graphical object.

23. A computer system comprising:

a processor;

a memory unit that stores instructions associated with an application executed by the processor; and an interconnect coupling the processor and the memory unit, enabling the computer system to execute the application and perform operations of:

receiving input associated with a first graphical object in a first window of a graphical user interface; and in response to receiving the input associated with the first graphical object:

moving the first graphical object from the first window to a second window in the graphical user interface; and positioning the first graphical object in a structural relationship of graphical objects in the second window, the structural relationship being a first collection of graphical objects with each graphical object representing a portion of information related to a multimedia composition;

displaying the first graphical object at a first level of a hierarchy displayed in the second window, the first graphical object representing a menu visible during a rendering of a new multimedia composition;

upon detecting movement of a second graphical object from the first window to the second window, displaying the second graphical object at a second level of the hierarchy, the second level of the hierarchy deeper than the first level of the hierarchy;

while the first graphical object is displayed, appending a first menu item, from the menu, to the first graphical object;

displaying a first link, in the second window, between the second graphical object and the first menu item appended to the first graphical object wherein appending the first menu item includes:

creating the first menu item to describe content associated with the second graphical object;

appending a graphical field to the first graphical object, the graphical field including display of the first menu item;

creating the first link, the first link including a first directional indicator that describes a parent-child relationship between the first graphical object and the second graphical object; and wherein displaying the first link includes: connecting the graphical field to the second graphical object via the first link;

wherein connecting the graphical field to the second graphical object via the first link includes:

indicating that video content associated with the second graphical object will be accessed upon selection of the first menu item from the rendered instance of the menu visible during the rendering of a new multimedia composition.

24. The method as in claim 1, comprising:

upon detecting movement of a third graphical object from the first window to the second window, displaying the third graphical object at the second level of the hierarchy displayed in the second window;

creating a second menu item to be related to content associated with the third graphical object;

expanding the graphical field currently appended to the first graphical object;

displaying the first menu item and the second menu item within an expanded graphical field appended to the first graphical object;

displaying the first link between the expanded graphical field and the second graphical object;

creating a second link, the second link including a second directional indicator that describes a parent-child relationship between the first graphical object and the third graphical object; and connecting the expanded graphical field to the third graphical object via the second link.

25. The method as in claim 24, wherein connecting the expanded graphical field to the third graphical object via the second link includes:

indicating that video content associated with the third graphical object will be accessed upon selection of the second selectable menu item from the menu visible during the rendering of a new multimedia composition.

26. The method as in claim 24, comprising:

displaying the first link substantially proximate to the first menu item displayed within the expanded graphical field; and displaying the second link substantially proximate to the second menu item displayed within the expanded graphical field.

27. The method as in claim 24, comprising:

displaying the first link as connected to a second graphical field appended to the second graphical object, the second graphical field including text describing content associated with the second graphical object; and displaying the second link as connected to a third graphical field appended to the third graphical object, the third graphical field including text describing content associated with the third graphical object.

28. The method as in claim 1, comprising:

wherein each graphical object in the first window and the second window comprises a screen shot of at least one video frame extracted from content associated with the respective graphical object.

\* \* \* \* \*